United States Patent [19]

Drs

[11] Patent Number: 5,356,671

[45] Date of Patent: Oct. 18, 1994

[54] CONCRETE SPRAYING PROCESS

[75] Inventor: Josef F. Drs, Vienna, Austria

[73] Assignee: Sandoz Ltd., Basle, Switzerland

[21] Appl. No.: 32,215

[22] Filed: Mar. 17, 1993

Related U.S. Application Data

[63] Continuation of Ser. No. 929,650, Aug. 12, 1992, abandoned, which is a continuation of Ser. No. 662,873, Mar. 1, 1991, abandoned.

[30] Foreign Application Priority Data

Mar. 1, 1990 [DE] Fed. Rep. of Germany ....... 4006725

[51] Int. Cl.$^5$ ................................. B05D 1/02
[52] U.S. Cl. .................... 427/427; 106/724; 106/727; 106/729; 106/737; 106/802; 106/805; 106/808; 427/215; 427/220; 427/221; 427/384; 427/385.5
[58] Field of Search ............... 106/737, 724, 802, 808, 106/727, 729, 805; 427/427, 397.7, 215, 220, 221, 384, 385.5; 428/403, 404, 688, 703

[56] References Cited

U.S. PATENT DOCUMENTS

| | | | |
|---|---|---|---|
| 3,503,771 | 3/1970 | Kroyer | 106/712 |
| 4,292,351 | 9/1981 | Ito et al. | 427/403 |
| 4,345,037 | 8/1982 | Fyles et al. | 106/711 |
| 4,363,666 | 12/1982 | Johnson et al. | 106/711 |
| 4,373,957 | 2/1983 | Pedersen | 106/711 |
| 4,377,415 | 3/1983 | Johnson et al. | 106/711 |
| 4,384,896 | 5/1983 | Aitcin et al. | 106/288 |
| 4,654,165 | 3/1987 | Eisenberg | 252/408.1 |
| 4,656,049 | 4/1987 | Noto | 427/10 |
| 4,673,659 | 6/1987 | Wood et al. | 106/737 |
| 4,707,453 | 11/1987 | Wagner et al. | 436/501 |
| 4,804,563 | 2/1989 | Hillemeier et al. | 427/397 |

FOREIGN PATENT DOCUMENTS

| | | |
|---|---|---|
| 0263606 | 9/1987 | European Pat. Off. |
| 0289720 | 2/1988 | European Pat. Off. |
| 0307066 | 3/1989 | European Pat. Off. |
| 2629196 | 1/1978 | Fed. Rep. of Germany |
| 3246604 | 6/1984 | Fed. Rep. of Germany |
| 37-20783 | 1/1989 | Fed. Rep. of Germany |
| 3838029 | 5/1989 | Fed. Rep. of Germany |
| 2643629 | 2/1990 | France |
| 60-151266 | 8/1985 | Japan |
| 154801 | 9/1986 | Norway |
| 655296 | 11/1983 | Switzerland |
| 2131409 | 6/1984 | United Kingdom ................ 106/737 |
| WO87/02978 | 5/1987 | World Int. Prop. O. |

OTHER PUBLICATIONS

Chemical Abstract No. 102:66471k (1984).
Chemical Abstract No. 110:198226j (1989).
"Betonwerk & Fertigteil-Technik," Issue 11 (1989) pp. 62-71 and 88-90.
"TIS," November 1989, p. 752.
"Tiefbau-BG," December 1989 p. 860.
"Zement-Kalp-Gips," Nr. 6, 1968, pp. 263-266.
"Concrete," March 1986, vol. 110, pp. 19-21 (UK).
"Concrete," October 1985, vol. 104, pp. 20-23 (UK).
"Betonwerk & Fertigteil-Technik," Issue 8 (1989), pp. 571-580.
"Portland Cement—Composition, Production and Properties," G. C. Bye (1983), Pergman Press, pp. 4-5.
"Cement and Mortar Additives," A. J. Franklin (1976), Noyes Data Corporation, pp. 169-170.

*Primary Examiner*—Anthony Green
*Attorney, Agent, or Firm*—Robert S. Honor; Richard E. Vila; Carol A. Loeschorn

[57] ABSTRACT

A process for improving the rebound properties of sprayed concrete comprises the inclusion therein of micro-silica which has been pretreated with from 2 to 25% by weight thereof of a liquid selected from water, an alkanolamine, a polyol and an aqueous solution of at least one concrete additive, an alkanolamine, a polyol and a water-soluble cellulosic compound. The process is especially effective when used in conjunction with the dry spraying process.

15 Claims, No Drawings

CONCRETE SPRAYING PROCESS

This is a continuation of application Ser. No. 07/929,650, filed Aug. 12, 1992, now abandoned, which in turn is a continuation of application Ser. No. 07/662,873, filed Mar. 1, 1991, now abandoned.

The invention relates to a concrete spraying process, and in particular to the use of micro-silica in dry spraying processes.

In a dry concrete spraying process, all of the components of a concrete mixture, apart from water and optional additives which are dissolved in water, are mixed whilst dry and introduced pneumatically into a spray nozzle, where the dry mix is mixed with water and subsequently sprayed on to a substrate.

One of the disadvantages of this dry spraying process is the unacceptable degree of loss by rebound of the concrete mixture from the substrate, and it has been proposed to reduce this rebound loss by adding micro-silica (also known as silica fume) to the dry mix. If this material is added as a powder, the reduction in rebound is less than that obtainable when an aqueous suspension of micro-silica is used. However, use of the powder in this manner brings the disadvantages of increased dust formation and the handling difficulties encountered with finely-dispersed powders.

If, on the other hand, micro-silica is used in the form of an aqueous suspension, it cannot be admixed with the dry mix, but must be added to the mixing water or introduced to the nozzle through its own pipe. Surprisingly however, the dust formation in such a process is not reduced. There therefore remains a need for a product which permits the reduction of rebound losses, yet which avoids the disadvantages hereinabove described.

It has now been found that a micro-silica powder which is pretreated with certain liquids fulfils these requirements, and that a micro-silica powder which has been pretreated with an aqueous solution of hardening accelerators or other additives has further advantages.

There is therefore provided, according to the present invention, a process for improving the rebound properties of sprayed concrete, comprising the inclusion therein of micro-silica powder which has been pretreated with from 2 to 25% by weight thereof of a liquid selected from water, an alkanolamine, a polyol and an aqueous solution of at least one material selected from a concrete additive, an alkanolamine, a polyol and a water-soluble cellulosic compound.

Although this invention may be used with a wet spraying process, use with a dry spraying process gives especially good results. The invention therefore also provides a dry spraying process for applying concrete to a substrate by the steps of mixing dry components of a concrete, introducing the mixture thus formed to a nozzle wherein it is mixed with water and spraying it from the nozzle on to a substrate, the concrete comprising dry micro-silica powder which has been pretreated with from 2 to 25 percent by weight thereof of a liquid as hereinabove described.

The invention additionally provides a powdery admixture for use in concrete mixtures which are to be applied by spraying, particularly by dry spraying, comprising micro-silica which has been treated with a liquid as hereinabove described.

The micro-silica is preferably incorporated into a dry mix comprising cement, aggregate and other admixed materials, and this mixture is admixed with water by any known method in the spray nozzle and is sprayed. In this dry spraying process, a reduction in rebound is attained, which is at least as good as that obtained when using an aqueous suspension of micro-silica, but there is no increased dust formation. In addition, the micro-silica which is pretreated in the manner hereinabove described is a pourable powder which is easy to handle and simple to measure out. If an aqueous solution of additives (for example, hardening accelerators) is used for pretreatment, there is produced a micro-silica powder which can be added to the dry mix as a combination of active materials, and this permits the exact and economical dispensing of these active materials.

Micro-silica (silica fume), as it is used in the above-described process, is an extremely finely-divided amorphous powder, comprising at least 90 percent by weight of silicon dioxide. The particles are globular and have a diameter of from 0.1 to 0.2 $\mu$m and a specific surface of from 15 to 30 $m^2/g$. This micro-silica is a by-product in the production of silicon or ferro-silicon.

As an alternative, pure silicon dioxide can also be used, and this is produced synthetically (precipitation of silicic acid). This enables a considerably higher degree of fineness (up to 200 $m^2/g$) to be achieved.

Other finely-divided pozzolanic materials can be mixed with the micro-silica powder of this invention. Examples of such materials include fly ash, shell ash, ground blast-furnace slag, etc. Such a mixture should contain at least 50% micro-silica in order to attain the desired reduction in rebound. It is preferred that pure micro-silica be used alone.

For pretreatment, micro-silica is mixed with 2 to 25 percent by weight of a liquid selected from the group hereinabove described. The reference to "liquid" encompasses not only individual liquids but also blends of any two or more of these liquids. In the case of those liquids which are aqueous solutions of materials, any two or more of the specified materials may be dissolved therein. Pretreatment is carried out preferably by spraying, and the sprayed powder is then stirred in a mixer until a uniformly moistened powder is obtained. The preferred liquids are water and aqueous solutions of concrete additives. Other substances which have been found to be especially useful are glycerol and aqueous solutions of glycerol, polyethylene glycols, triethanolamine, methyl cellulose and hydroxyethyl cellulose.

The concrete additives which are used in the abovementioned aqueous solutions are those which are usually used in concrete mixtures which are applied by spraying, for example, air entraining agents, stabilizers, water reducing agents and in particular hardening accelerators. One preferred additive is a mixture of sodium or potassium aluminate and potash (potassium carbonate), which is known as a hardening accelerator for spraying concrete mixtures and which can also be used as in the form of an aqueous solution. In a preferred composition, an admixture comprises from 50 to 70 parts of micro-silica, from 8–12 parts of potash and from 22–38 parts of sodium or potassium aluminate per 100 parts admixture solids.

The use of an aqueous solution of such an accelerator in the process of the present invention results in considerable practical advantages when a dry spraying process is used. In this case, the previous practice has been to introduce a solution of accelerators into the spray nozzle, there to be combined with the dry mix, by means of a separate hose line. Optimum dosing is difficult in this case and over-dosing can lead to inferior final strength of the sprayed concrete. However, if this aqueous solution is used according to the invention to pretreat the micro-silica, the appropriate quantity of hardening accelerator may be incorporated into the dry mix and the abovementioned disadvantages may be avoided.

Micro-silica and the solution of hardening accelerators can be mixed in any quantities, so long as the water content of the micro-silica thus treated is no more than 25 percent by weight. If larger quantities of water are employed, an aqueous suspension of micro-silica is produced, and this no longer confers the advantages of this invention. Thus, it is advantageous to mix together those quantities of micro-silica and aqueous solution which are normally used together in the concrete mixture. The beneficial effects of the invention are achieved by the use of from 3 to 20%, preferably 5–15% by weight of cement of micro-silica and 3 to 8%, preferably 4–6% by weight of cement of hardening accelerator.

When mixing micro-silica with an aqueous solution of hardening accelerators, it is preferable first to mix micro-silica with potash, and then coat this mixture with an aqueous solution of sodium or potassium aluminate.

However, micro-silica or precipitated silicic acid or mixtures thereof with fly ash and similar materials can also be pre-mixed with a dry mixture of accelerating substances (soda, potash and/or other alkali hydroxides, calcium hydroxide and sodium aluminate), and this powdery mixture can be treated with liquid.

In the following examples, all references to parts are understood to be parts by weight, and temperatures are expressed in degrees celsius.

EXAMPLE 1

57 parts of micro-silica are pre-mixed in a powder mixer with 11.9 parts of soda, 9.9 parts of sodium aluminate and 2.6 parts of calcium hydroxide, and coated with 18.6 parts of an aqueous solution of 0.5 parts of hydroxy ethyl cellulose in 99.5 parts of water.

EXAMPLE 2

55 parts of micro-silica are pre-mixed in a powder mixer with 11.4 parts of soda, 9.5 parts of sodium aluminate and 2.5 parts of calcium hydroxide, and coated with 21.6 parts of glycerol.

EXAMPLE 3

8.33 parts of water are added to 50 parts of micro-silica (bulk density 0.25 kg/dm$^3$) in a fluidising mixer equipped with fine spraying nozzles. The resulting product is a granular solid of bulk density 0.56 kg/dm$^3$.

EXAMPLE 4

Example 3 is repeated with 50 parts of micro-silica (bulk density 0.307 kg/dm$^3$) and 8 parts of water. The resulting granular solid has a bulk density of 0.553 kg/dm$^3$.

EXAMPLE 5

Example 4 is repeated three times, with 0.5 parts of one of the following substances being added each time to the water:
(a) hexylene glycol
(b) diethylene glycol
(c) glycerol

EXAMPLE 6

Example 4 is repeated with the 8 parts of water being replaced by 8 parts of a solution of 0.5 parts of hydroxyethyl cellulose in 99.5 parts of water.

EXAMPLE 7

50 parts of micro,silica is mixed with 25 parts soda, 5 parts of potassium hydroxide and 20 parts of sodium aluminate. This mixture is granulated with 8 parts of water as described in Example 3.

EXAMPLE 8

50 parts of micro-silica is mixed with 8 parts of water as described in Example 3. The resulting granular solid is then mixed with 25 parts of soda, 5 parts of calcium hydroxide and 20 parts of sodium aluminate.

EXAMPLE 9

Example 8 is repeated, with the substitution of the following quantities for those of that example:

| | |
|---|---|
| micro-silica | 50 |
| water | 6.5 |
| soda | 12.5 |
| calcium hydroxide | 2.5 |
| sodium aluminate | 10 |

EXAMPLE 10

Example 9 is repeated, with 0.5 parts of glycerol being added to the water prior to granulation.

EXAMPLE 11

50 parts of micro-silica is granulated with 8 parts of a 45% by weight aqueous solution of sodium aluminate, according to the method of Example 3.

EXAMPLE 12

Example 11 is repeated with the substitution of 8 parts of a 45% aqueous solution of potassium aluminate for the sodium aluminate solution of Example 11.

EXAMPLE 13

Example 11 is repeated with the substitution for the sodium aluminate solution of that example of 15 parts of an aqueous solution having the overall composition 45 parts potassium aluminate, 15 parts potassium carbonate and 40 parts water.

EXAMPLE 14

Preparation of a dry mix concrete according to the invention and comparison with a conventional dry mix concrete.

Two dry spraying mixtures were prepared by conventional mixing of ingredients and applied by spraying to a substrate. The ingredients and their quantities were as follows:

| | Invention | Comparison |
|---|---|---|
| (a) Dry mixture:- | | |
| cement | 400 | 400 |
| micro-silica (from Example 4) | 20 | — |
| aggregate | 1740 | 1740 |
| (b) Mixing at nozzle:- | | |
| water | 200 | 200 |

-continued

|                              | Invention | Comparison |
|------------------------------|-----------|------------|
| micro-silica slurry[1]       | —         | 40         |
| accelerator[2]               | 24        | 24         |

[1] A micro-silica aqueous slurry prepared by the dispersion of 50 parts of micro-silica in 50 parts of water.
[2] The material used is MEYCO "Gunit" F 100

It can be seen from the quantities table above that the composition according to the invention has the pretreated micro-silica powder in the dry mix, whereas in the conventional mix, the micro-silica is incorporated as a slurry at the nozzle. This latter necessitates the extra complexity of a separate line to the nozzle to convey the slurry.

The hardening and rebound properties of the two compositions are similar. However, the compositions according to the invention generate considerably less dust, which makes the working environment much more pleasant and less hazardous. Moreover, as previously mentioned, the equipment needed to apply the composition according to the invention is less complex, leading to greater reliability and efficiency.

EXAMPLE 15

An example of the use of the invention in a wet spraying process, with a comparative example.

The following components are used:

|                                      | Invention | Comparison |
|--------------------------------------|-----------|------------|
| cement                               | 400       | 400        |
| pretreated micro-silica (from Example 4) | 20    | —          |
| untreated micro-silica               | —         | 20         |
| aggregate                            | 1740      | 1740       |
| water                                | 220       | 240        |
| superplasticiser[1]                  | 4         | 4          |

[1] "Rheobuild" 1000 is used.

The properties of the sprayed concrete are similar, but here again the comparison composition suffers from the dust problem. Moreover, the untreated micro-silica of the comparison composition must be added by hand, whereas the pretreated micro-silica is added mechanically.

EXAMPLE 16

Example of a dry mix which comprises an accelerator.

Two dry spraying compositions, one according to the invention and the other a comparative example based on the known art, comprise the following materials:

|                                       | Invention | Comparison |
|---------------------------------------|-----------|------------|
| (a) Dry mixture:-                     |           |            |
| cement                                | 400       | 400        |
| aggregate                             | 1740      | 1740       |
| pretreated micro-silica (from Example 8) | 40    | —          |
| commercially-available accelerator[1] | —         | 24         |
| (b) Mixing at nozzle:-                |           |            |
| water                                 | 200       | 200        |
| micro-silica slurry (as used in Example 14) | — | 40         |

[1] BARRA "Gunit" LL is used.

The dry components are blended by means of a conveyor belt dosing apparatus and conveyed pneumatically to a spraying nozzle where they are blended with a further component (water in the case of the invention composition, water and micro-silica aqueous slurry in the case of the comparison composition) and sprayed on to a substrate.

The two sprayed concretes display similar properties, but the composition according to the invention gives several significant practical advantages. Firstly, there is the greatly decreased dust production of the compositions according to the invention. Secondly, there is the simpler equipment previously referred to in Example 14. Thirdly, there is the simplified procedure brought about as a result of the incorporation of the accelerator into the micro-silica (one less component to add). Fourthly, there is the fact that there is no danger with the present invention of overdosing the composition with accelerator as there is with the conventional accelerator.

What is claimed is:

1. A process for improving the rebound properties of sprayed concrete, which comprises adding to a dry concrete mix, prior to spraying, a micro-silica powder which has been pretreated by spraying said powder with from 2 to 25% by weight thereof of at least one liquid chosen from water, an alkanolamine, a polyol, or an aqueous solution of at least one material chosen from an air entraining agent, a stabilizer, a water reducing agent, a hardening accelerator, an alkanolamine, a polyol or a water-soluble cellulosic compound, to form a micro-silica containing dry concrete mix, combining said micro-silica containing dry concrete mix with water to form an aqueous concrete mixture and spraying said aqueous mixture onto a substrate, wherein said dry concrete mix comprises cement and aggregate.

2. A dry spraying process for applying concrete to a substrate comprising the steps of mixing cement and aggregate to form a dry concrete mixture, introducing said dry concrete mixture to a nozzle wherein the dry concrete mixture is mixed with water to form a liquid mixture and spraying said liquid mixture onto a substrate, the dry concrete mixture additionally including a dry micro-silica powder which has been pretreated by spraying said powder with from 2 to 25% by weight thereof of at least one liquid chosen from water, an alkanolamine, a polyol, or an aqueous solution of at least one material chosen from an air entraining agent, a stabilizer, a water reducing agent, a hardening accelerator, an alkanolamine, a polyol or a water-soluble cellulosic compound.

3. A process according to claim 1, wherein the liquid is chosen from water or an aqueous solution of at least one material chosen from an air entraining agent, a stabilizer, a water reducing agent, or a hardening accelerator.

4. A process according to claim 1, wherein the liquid is chosen from glycerol or aqueous solutions of glycerol, triethanolamine, methyl cellulose, or hydroxyethyl cellulose.

5. A process according to claim 1, wherein the liquid is an aqueous solution of at least one material chosen from an air entraining agent, a stabilizer, a water reducing agent, or a hardening accelerator.

6. A process according to claim 5, wherein said liquid is an aqueous solution of a hardening accelerator.

7. A process according to claim 6, wherein the micro-silica is present in an amount of 3 to 20% by weight based on the weight of cement and said hardening accelerator is present in an amount of 3 to 8% by weight based on the weight of cement.

8. The process according to claim 7, wherein the micro-silica is present in an amount of 5–15% by weight based on the weight of the cement and the hardening accelerator is present in an amount of 4 to 6% by weight based on the weight of cement.

9. A process according to claim 7, wherein the micro-silica is premixed with a potash in dry form prior to being pretreated with said aqueous solution of a hardening accelerator.

10. A process according to claim 9, wherein said hardening accelerator is sodium or potassium aluminate.

11. A powdery shotcrete admixture comprising micro-silica powder which has been pretreated by spraying said powder with from 2 to 25% by weight thereof of at least one liquid chosen from water, an alkanolamine, a polyol, or an aqueous solution of at least one material chosen from a hardening accelerator, an alkanolamine, a polyol or a water-soluble cellulosic compound.

12. A shotcrete admixture according to claim 11, wherein the liquid is a aqueous solution of a hardening accelerator.

13. A shotcrete admixture according to claim 12, wherein said micro-silica is premixed with a potash in dry form.

14. A shotcrete admixture according to claim 13, wherein the hardening accelerator is sodium or potassium aluminate.

15. A shotcrete admixture according to claim 14, wherein the admixture comprises from 50 to 70 pans of micro-silica, from 8–12 parts of potash and from 22–38 parts of sodium or potassium aluminate per 100 parts admixture solids, all parts being by weight.

* * * * *